(12) United States Patent
Wang et al.

(10) Patent No.: US 11,366,973 B2
(45) Date of Patent: Jun. 21, 2022

(54) METHOD AND APPARATUS FOR DETERMINING A TOPIC

(71) Applicant: Beijing Baidu Netcom Science And Technology Co., LTD., Beijing (CN)

(72) Inventors: Jingwei Wang, Beijing (CN); Ao Zhang, Beijing (CN); Jiaxiang Liu, Beijing (CN); Yu Sun, Beijing (CN); Zhi Li, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 112 days.

(21) Appl. No.: 16/691,104

(22) Filed: Nov. 21, 2019

(65) Prior Publication Data

US 2020/0210522 A1 Jul. 2, 2020

(30) Foreign Application Priority Data

Dec. 28, 2018 (CN) .......................... 201811624901.2

(51) Int. Cl.
*G06F 40/35* (2020.01)
*G06F 40/186* (2020.01)
*G06F 40/289* (2020.01)

(52) U.S. Cl.
CPC ............ *G06F 40/35* (2020.01); *G06F 40/186* (2020.01); *G06F 40/289* (2020.01)

(58) Field of Classification Search
CPC .. G06F 40/30; G06F 16/3344; G06F 16/3329; G06F 40/35; G06F 40/205; G06F 40/216; G06F 16/90332; G06F 40/186; G06F 40/289
See application file for complete search history.

(56) References Cited

U.S. PATENT DOCUMENTS

| | | | | |
|---|---|---|---|---|
| 6,766,320 B1* | 7/2004 | Wang | ..................... | G06F 16/313 |
| 7,747,601 B2* | 6/2010 | Cooper | .................. | G06N 20/00 |
| | | | | 707/708 |
| 8,645,122 B1* | 2/2014 | Di Fabbrizio | ........ | G06F 40/237 |
| | | | | 704/9 |
| 9,213,748 B1* | 12/2015 | Matias | .................. | G06F 16/951 |
| 2006/0155673 A1* | 7/2006 | Houck | ................ | G06F 16/3329 |
| 2015/0100582 A1* | 4/2015 | Xi | ........................ | G06F 16/7867 |
| | | | | 707/738 |

(Continued)

*Primary Examiner* — Wilson W Tsui

(74) *Attorney, Agent, or Firm* — Weaver Austin Villeneuve & Sampson LLP

(57) ABSTRACT

Embodiments of the present disclosure disclose a method and apparatus for determining a topic. A specific embodiment of the method comprises: determining a to-be-recognized sentence sequence; calculating similarities between the to-be-recognized sentence sequence and each of topic templates in a topic template set in a target area, the each of the topic templates in the topic template set corresponding to a topic in at least one topic in the target area, the topic template including a topic section sequence, and a topic section including a topic sentence sequence; and determining a topic of the to-be-recognized sentence sequence according to an associated parameter, the associated parameter including the similarities between the to-be-recognized sentence sequence and the each of the topic templates in the topic template set. This embodiment reduces labor costs during a topic segmentation.

17 Claims, 6 Drawing Sheets

(56) References Cited

U.S. PATENT DOCUMENTS

| | | | |
|---|---|---|---|
| 2015/0227508 A1* | 8/2015 | Howald | G06F 40/117 704/9 |
| 2015/0279366 A1* | 10/2015 | Krestnikov | G10L 15/22 704/235 |
| 2016/0188672 A1* | 6/2016 | Lev | G06F 16/358 707/728 |
| 2016/0196334 A1* | 7/2016 | Bastide | G06F 16/3344 707/776 |
| 2017/0069316 A1* | 3/2017 | Makino | G10L 15/22 |
| 2017/0199866 A1* | 7/2017 | Gunaratna | G06F 40/284 |

* cited by examiner

METHOD AND APPARATUS FOR DETERMINING A TOPIC

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and specifically to a method and apparatus for determining a topic.

BACKGROUND

With the popularity of smart devices and the increase of users in number, human-machine interaction modes also change. Dialogue systems (e.g., Apple's Siri smart voice assistant, Amazon's Alex smart assistant, or China Unicom's smart customer service) are gradually and widely applied. The topic segmentation of a dialogue system is to divide a dialogue into a plurality of paragraphs. Dialogue sentences in each paragraph belong to the same topic, and different paragraphs correspond to different topics.

In the existing technology, a supervised learning method is mainly adopted to manually annotate a training corpus, and then a model is trained based on the training corpus to detect a segmentation position between the paragraphs.

SUMMARY

Embodiments of the present disclosure propose a method and apparatus for determining a topic.

In a first aspect, some embodiments of the present disclosure provide a method for determining a topic. The method includes: determining a to-be-recognized sentence sequence; calculating similarities between the to-be-recognized sentence sequence and each of topic templates in a topic template set in a target area, the each of the topic templates in the topic template set corresponding to a topic in at least one topic in the target area, a topic template including a topic section sequence, and a topic section including a topic sentence sequence; and determining a topic of the to-be-recognized sentence sequence according to an associated parameter, the associated parameter including the similarities between the to-be-recognized sentence sequence and the each of the topic templates in the topic template set.

In a second aspect, some embodiments of the present disclosure provide an apparatus for determining a topic. The apparatus includes: a first determining unit, configured to determine a to-be-recognized sentence sequence; a calculating unit, configured to calculate similarities between the to-be-recognized sentence sequence and each of topic templates in a topic template set in a target area, the each of the topic templates in the topic template set corresponding to a topic in at least one topic in the target area, a topic template including a topic section sequence, and a topic section including a topic sentence sequence; and a second determining unit, configured to determine a topic of the to-be-recognized sentence sequence according to an associated parameter, the associated parameter including the similarities between the to-be-recognized sentence sequence and the each of the topic templates in the topic template set.

In a third aspect, some embodiments of the present disclosure provide a server. The server includes: one or more processors; and a storage device, configured to store one or more programs. The one or more programs, when executed by the one or more processors, cause the one or more processors to implement the method described in any implementation in the first aspect.

In a fourth aspect, some embodiments of the present disclosure provide a computer readable storage medium storing a computer program. The computer program, when executed by a processor, implements the method described in any implementation in the first aspect.

According to the method and apparatus for determining a topic provided by some embodiments of the present disclosure, the topic and the topic template corresponding to the topic are preset for the target area, the topic template includes the topic section sequence, and a topic section includes the topic sentence sequence. Then, the similarities between the to-be-recognized sentence sequence and the each of the topic templates in the topic template set in the target area is calculated. Finally, the topic of the to-be-recognized sentence sequence is determined according to the associated parameter. The associated parameter includes the similarities between the to-be-recognized sentence sequence and each of the topic templates in the topic template set. Therefore, it is only necessary to set topic templates for different topics in the target area without manually annotating a large number of training corpora, which greatly reduces the labor costs for the annotation, and at the same time, the problem that the accuracy of the topic recognition is low due to different standards of manual annotations can be solved. That is, the accuracy of the topic recognition is improved.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of the present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that some embodiments in the present disclosure and some features in the disclosure may be combined with each other on a non-conflict basis. Features of the present disclosure will be described below in detail with reference to the accompanying drawings and in combination with the embodiments.

Figure 1:
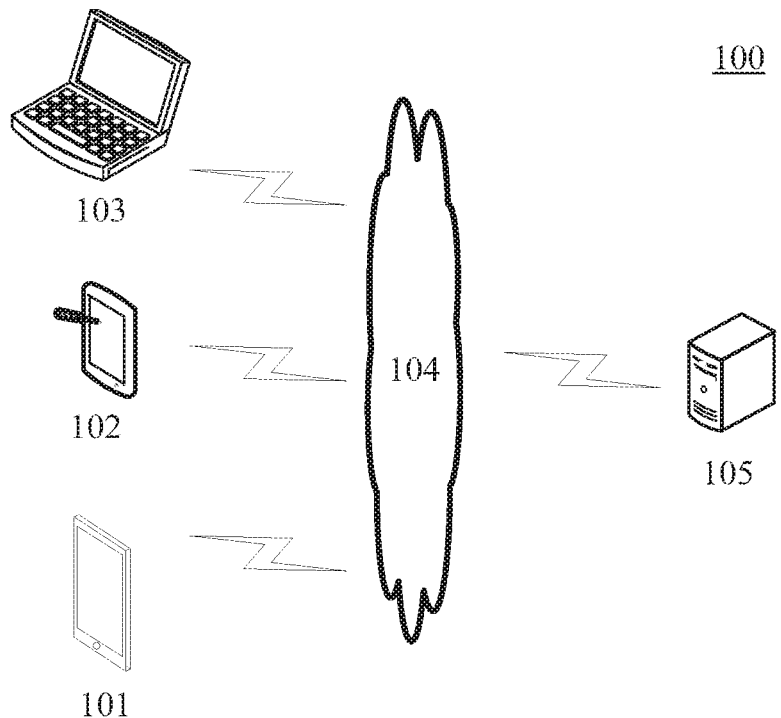
FIG. 1 is a diagram of an exemplary system architecture in which the embodiments of the present disclosure may be applied.

FIG. 1 shows an exemplary system architecture 100 in which a method for determining a topic or an apparatus for determining a topic according to some embodiments of the present disclosure may be applied.

As shown in FIG. 1, the system architecture 100 may include a terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send messages. Various communication client applications (e.g., a self-help dialogue application, a web browser application, a shopping application, a search application, an instant communication tool, a mailbox client, and social platform software) may be installed on the terminal devices 101, 102 and 103.

The terminal devices 101, 102 and 103 may be hardware or software. When being the hardware, the terminal devices 101, 102 and 103 may be various electronic devices having a display screen and supporting an information input, the electronic devices including, but not limited to, a smart phone, a tablet computer, an e-book reader, an MP3 player (moving picture experts group audio layer III), an MP4 (moving picture experts group audio layer IV) player, a laptop portable computer and a desktop computer. When being software, the terminal devices 101, 102 and 103 may be installed in the above-listed electronic devices. The terminal devices may be implemented as a plurality of pieces of software or a plurality of software modules (e.g., software or software modules for providing a self-help dialogue service), or as a single piece of software or a single software module, which will not be specifically defined here.

The server 105 may be a server providing various kinds of services, for example, a backend server providing support for the self-help dialogue application displayed on the terminal devices 101, 102 and 103. The backend server may perform processing such as an analysis on data such as a received dialogue sentence inputted by the user, and feed back the processing result (e.g., the dialogue content of the self-help reply) to the terminal devices.

It should be noted that the method for determining a topic provided by some embodiments of the present disclosure is generally performed by the server 105. Correspondingly, the apparatus for determining a topic is generally provided in the server 105.

It should be noted that the server 105 may be hardware or software. When being the hardware, the server 105 may be implemented as a distributed server cluster composed of a plurality of servers, or as a single server. When being the software, the server 105 may be implemented as a plurality of pieces of software or a plurality of software modules (e.g., software or software modules for providing a self-help dialogue service), or as a single piece of software or a single software module, which will not be specifically defined here.

It should be appreciated that the numbers of the terminal devices, the networks and the servers in FIG. 1 are merely illustrative. Any number of terminal devices, networks and servers may be provided based on actual requirements.

Further referring to FIG. 2, FIG. 2 illustrates a flow 200 of a method for determining a topic according to an embodiment of the present disclosure. The method for determining a topic includes the following steps:

Step 201, determining a to-be-recognized sentence sequence.

In this embodiment, an executive body (e.g., the server shown in FIG. 1) of the method for determining a topic may determine the to-be-recognized sentence sequence using various implementations.

Here, the to-be-recognized sentence sequence may be composed of at least one sentence arranged in order.

In some alternative implementations of this embodiment, the executive body may determine a sentence sequence locally stored by the executive body as the to-be-recognized sentence sequence.

In some alternative implementations of this embodiment, the executive body may receive, by means of a wired connection or a wireless connection, a to-be-recognized sentence sequence from other electronic device connected to the executive body via a network. It should be noted that the wireless connection may include, but not limited to, a 3G/4G connection, a WiFi connection, a Bluetooth connection, a WiMAX connection, a Zigbee connection, an UWB (ultra wideband) connection, or other wireless connections now known or will be developed in the future.

Step 202, calculating a similarity between the to-be-recognized sentence sequence and each of the topic templates in a topic template set in a target area.

In this embodiment, the executive body may calculate the similarity between the to-be-recognized sentence sequence determined in step 201 and each of the topic templates in the topic template set in the target area using various implementations.

Here, the target area refers to any specific area. For example, the target area may refer to the following areas: the self-service dialogue area of telecom operators, the self-service dialogue area of banks, the self-service dialogue area of e-commerce platforms, the self-service dialogue area of insurance companies, or the like.

Here, for a target area, corresponding topics may be made in advance by a technologist in the area, at least one template corresponding to the topic may be made for each of the topics (e.g., by counting real historical dialogue records), and the sentence content in the template reflects the corresponding topic. Then, the sentence content of the template is divided into at least one section according to the business process of the corresponding topic, each section includes at least one sentence, and the at least one sentence included in the each section corresponds to one business process section. Finally, a topic template set corresponding to the target area may be obtained, each of the topic templates in the topic template set may include a topic sections sequence (i.e., a sequence consisting of at least one topic section in a sequential order), and each of the topic sections may include a topic sentence sequence (i.e., a sequence consisting of at least one sentence in a sequential order).

Figure 2A:
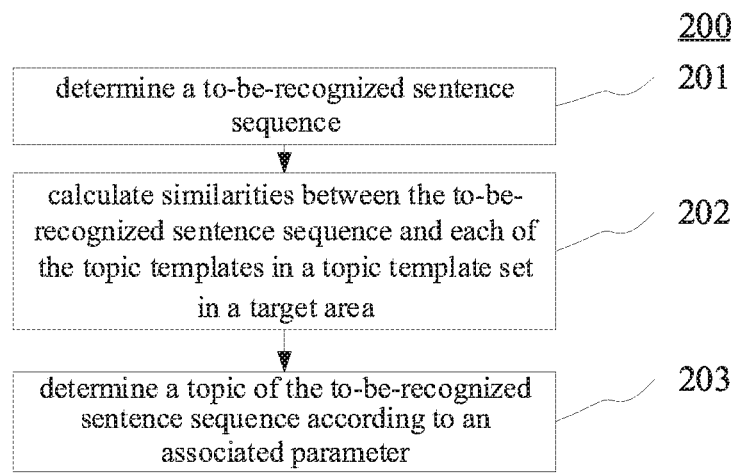
FIG. 2A is a flowchart of a method for determining a topic according to an embodiment of the present disclosure.
Figure 2B:
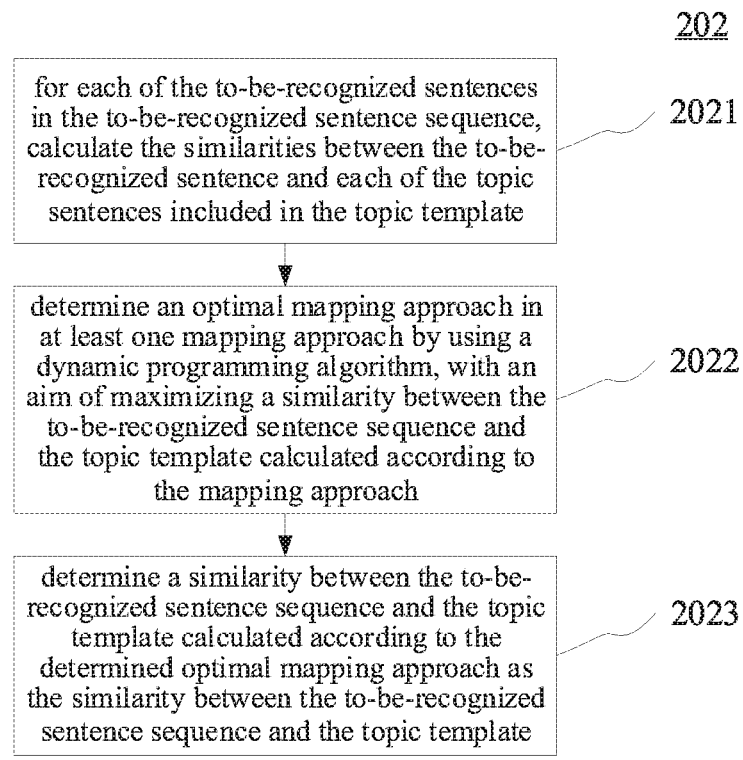
FIG. 2B is a flowchart of a first similarity calculation according to an embodiment of the present disclosure.

In some alternative implementations of this embodiment, step 202 may be performed as follows:

For each of the topic templates in the topic template set, a first similarity calculation is performed. Referring to FIG. 2B, FIG. 2B illustrates a flow of the first similarity calculation according to an embodiment of the present disclosure. The first similarity calculation may include sub-steps 2021-2023:

Sub-step 2021, for each of the to-be-recognized sentences in the to-be-recognized sentence sequence, calculating a similarity between the to-be-recognized sentence and each of the topic sentences included in the topic template.

That is, here, given that the topic section sequence included in the topic template includes S topic sections, and the topic sentence sequence included in the $i^{th}$ topic section includes $N_i$ sentences, the topic template includes N sentences, wherein $N=\Sigma_{i=1}^{S} N_i$. If the to-be-recognized sentence sequence includes M sentences, it is necessary to calculate the similarity between each of the to-be-recognized sentences in the M sentences and each of the topic sentences in the N topic sentences here. That is, M×N similarities are finally obtained.

It should be noted that various methods for calculating the similarity between two sentences are well-known techniques widely studied and applied at present, which will not be repeatedly described herein. For example, the semantic vectors corresponding to the two sentences may be first determined, and then the similarity between the obtained two semantic vectors is calculated using various methods of calculating a similarity between vectors, to be used as the similarity between the two sentences.

Sub-step 2022, determining an optimal mapping approach in at least one mapping approach by using a dynamic programming algorithm, with an aim of maximizing a similarity between the to-be-recognized sentence sequence and the topic template calculated according to the mapping approach.

Here, at least one mapping approach may be pre-given, the mapping approach is used to correspond each of the to-be-recognized sentences in the to-be-recognized sentence sequence to a topic section in the topic template.

Then, by using the dynamic programming algorithm, the optimal mapping approach may be determined in the at least one mapping approach, with the aim of maximizing the similarity between the to-be-recognized sentence sequence and the topic template that is calculated according to the mapping approach.

Here, the similarity between the to-be-recognized sentence sequence and the topic template may be calculated according to the mapping approach by adopting various implementations.

Figure 2C:
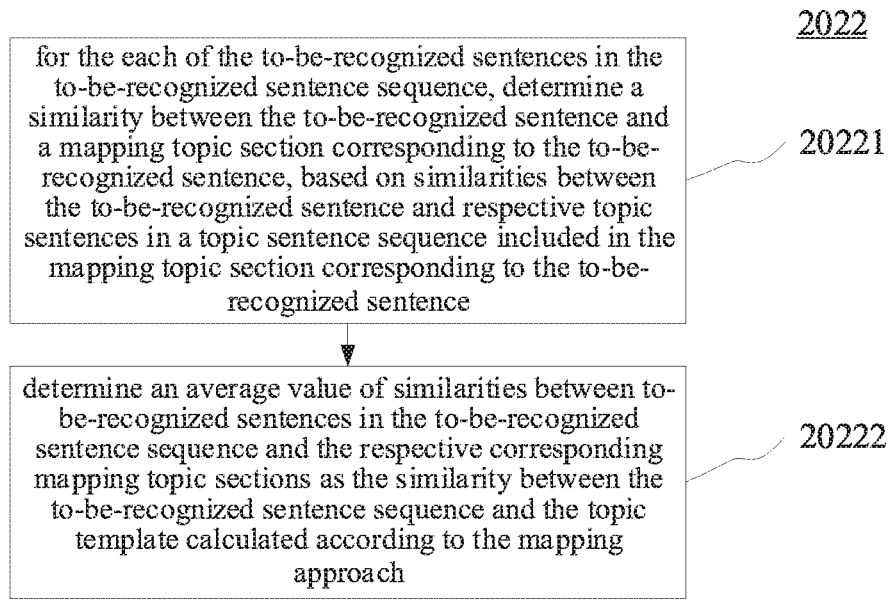
FIG. 2C is a flowchart of a second similarity calculation according to an embodiment of the present disclosure.

Alternatively, the similarity between the to-be-recognized sentence sequence and the topic template calculated according to the mapping approach may be calculated through a second similarity calculation. Referring to FIG. 2C, FIG. 2C illustrates a flow of the second similarity calculation according to an embodiment of the present disclosure. The second similarity calculation may include sub-steps 20221 and 20222:

Sub-step 20221, for each of the to-be-recognized sentences in the to-be-recognized sentence sequence, determining a similarity between the to-be-recognized sentence and the corresponding mapping topic section, based on similarities between the to-be-recognized sentence and respective topic sentences in a topic sentence sequence included in a mapping topic section corresponding to the to-be-recognized sentence.

Here, the mapping topic section corresponding to the to-be-recognized sentence refers to a topic section included in the topic template to which the to-be-recognized sentence is mapped according to the mapping approach.

Here, various implementations may be adopted to determine the similarity between the to-be-recognized sentence and the corresponding mapping topic section, according to the similarities between the to-be-recognized sentence and the respective topic sentences in the topic sentence sequence included in the mapping topic section corresponding to the to-be-recognized sentence.

Alternatively, sub-step 20221 may be performed as follows:

A maximum value in the similarities between the to-be-recognized sentence and the respective topic sentences in the topic sentence sequence included in the mapping topic section corresponding to the to-be-recognized sentence is determined as the similarity between the to-be-recognized sentence and the corresponding mapping topic section.

Alternatively, sub-step 20221 may also be performed as follows:

A weighted average value of the similarities between the to-be-recognized sentence and the respective topic sentences in the topic sentence sequence included in the mapping topic section corresponding to the to-be-recognized sentence and the to-be-recognized sentence is determined as the similarity between the to-be-recognized sentence and the corresponding mapping topic section.

Sub-step 20222, determining an average value of similarities between to-be-recognized sentences in the to-be-recognized sentence sequence and the respective corresponding mapping topic sections as the similarity between the to-be-recognized sentence sequence and the topic template calculated according to the mapping approach.

Figure 2D:
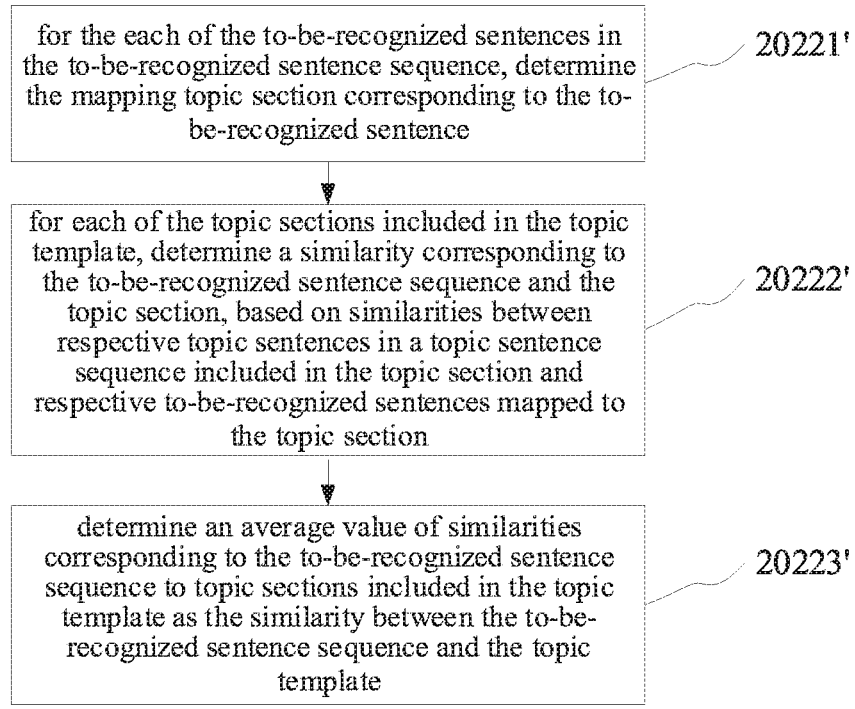
FIG. 2D is a flowchart of a third similarity calculation according to an embodiment of the present disclosure.

Alternatively, the similarity between the to-be-recognized sentence sequence and the topic template calculated according to the mapping approach may be calculated through a third similarity calculation. Referring to FIG. 2D, FIG. 2D illustrates a flow of the third similarity calculation according to an embodiment of the present disclosure. The third similarity calculation may include sub-steps 20221'-20223':

Sub-step 20221', for the each of to-be-recognized sentences in the to-be-recognized sentence sequence, the mapping topic section corresponding to the to-be-recognized sentence.

Here, the mapping topic section corresponding to the to-be-recognized sentence refers to the topic section included in the topic template to which the to-be-recognized sentence is mapped according to the mapping approach.

Sub-step 20222', for each of the topic sections included in the topic template, determining a similarity corresponding to the to-be-recognized sentence sequence and the topic section, based on the similarities between topic sentences in a topic sentence sequence included in the topic section and each of the to-be-recognized sentences mapped to the topic section.

Here, by adopting various implementations, the similarity corresponding to the to-be-recognized sentence sequence to the topic section may be determined based on the similarities between the topic sentences in the topic sentence sequence included in the topic section and the each of the to-be-recognized sentences mapped to the topic section.

Alternatively, sub-step 20222' may be performed as follows:

A maximum value in the similarities between the respective topic sentences in the topic sentence sequence included in the topic section and the each of the to-be-recognized sentences mapped to the topic section is determined as the similarity corresponding to the to-be-recognized sentence sequence and the topic section.

Alternatively, sub-step 20222' may also be performed as follows:

An average value of the similarities between the topic sentences in the topic sentence sequence included in the topic section and the each of the to-be-recognized sentences mapped to the topic section is determined as the similarity corresponding to the to-be-recognized sentence sequence and the topic section.

Sub-step 20223', determining an average value of similarities corresponding to the to-be-recognized sentence sequence to topic sections included in the topic template as the similarity between the to-be-recognized sentence sequence and the topic template.

Sub-step 2023, determining a similarity between the to-be-recognized sentence sequence and the topic template calculated according to the determined optimal mapping approach as the similarity between the to-be-recognized sentence sequence and the topic template.

According to sub-steps 2021-2023, the similarity between the to-be-recognized sentence sequence and the topic template may be obtained.

Alternatively, step 202 may also be performed as follows:

First, for each of the to-be-recognized sentences in the to-be-recognized sentence sequence, the similarity between the to-be-recognized sentence and each of the topic sentences included in the topic template may be calculated.

Then, the weighted average value or the maximum value of the calculated similarities is determined as the similarity between the to-be-recognized sentence sequence and the topic template.

Step 203, determining a topic of the to-be-recognized sentence sequence according to an associated parameter.

In this embodiment, the executive body may determine the topic of the to-be-recognized sentence sequence according to the associated parameter via various implementations.

Here, the associated parameter may include the similarities between the to-be-recognized sentence sequence and each of the topic templates in the topic template set.

In some alternative implementations of this embodiment, the executive body may determine the topic corresponding to the topic template having the maximum similarity to the to-be-recognized sentence sequence in the topic template set as the topic of the to-be-recognized sentence sequence.

In some alternative implementations of this embodiment, the executive body may first acquire a topic template subset composed of a topic template in the topic template set, a similarity between the topic template and the to-be-recognized sentence sequence being greater than a preset similarity threshold. Then, a topic in the at least one topic in the target area is determined as the topic of the to-be-recognized sentence sequence, the topic corresponding to maximum topic templates in the topic template subset.

In some alternative implementations of this embodiment, first, for each of the topics in the at least one topic in the target area, the executive body may further determine an average value of the similarities between the to-be-recognized sentence sequence and topic templates corresponding to the topic in the topic template set as the similarity between the to-be-recognized sentence sequence and the topic. Then, a topic having the highest similarity to the to-be-recognized sentence sequence in the at least one topic in the target area is determined as the topic of the to-be-recognized sentence sequence.

Figure 3:
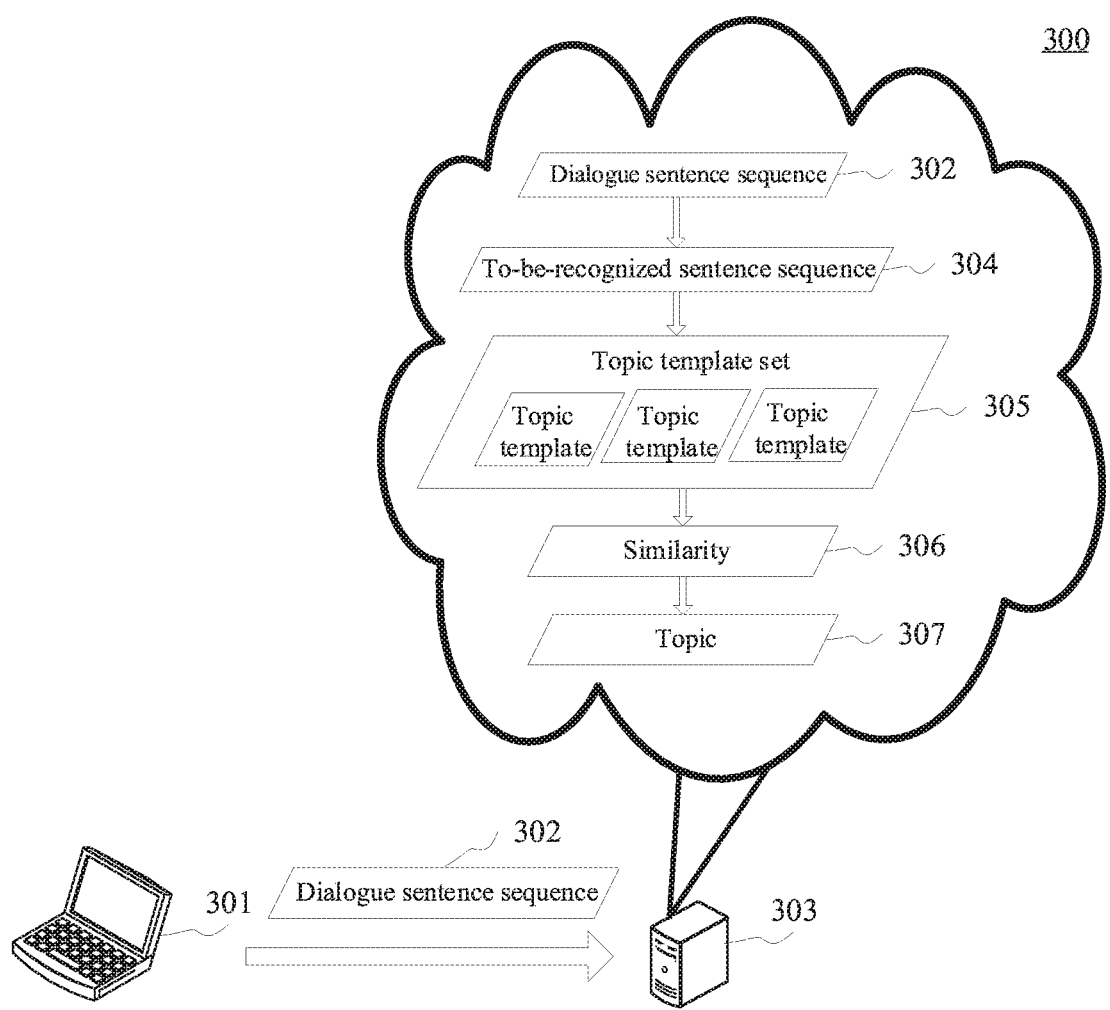
FIG. 3 is a schematic diagram of an application scenario of the method for determining a topic according to the present disclosure.

Further referring to FIG. 3, FIG. 3 is a schematic diagram of an application scenario of the method for determining a topic according to this embodiment. In the application scenario of FIG. 3, the user inputs the dialogue sentence sequence 302 using the terminal device 301. The terminal device 301 sends the dialogue sentence sequence 302 to the server 303. The server 303 determines the received dialogue sentence sequence 302 as the to-be-recognized sentence sequence 304. The server 303 calculates the similarity 306 between the to-be-recognized sentence sequence 304 and each topic template in the topic template set 305 in the target area. The server 303 determines the topic 307 of the to-be-recognized sentence sequence based on an associated parameter.

According to the method provided by the foregoing embodiments of the present disclosure, topics and topic templates corresponding to the topic are preset for the target area, a topic template includes a topic section sequence, and a topic section includes the topic sentence sequence. Then, the similarities between the to-be-recognized sentence sequence and each of the topic templates in the topic template set in the target area is calculated. Finally, the topic of the to-be-recognized sentence sequence is determined according to an associated parameter. The associated parameter includes the similarities between the to-be-recognized sentence sequence and each of the topic templates in the topic template set. Therefore, it is only necessary to set topic templates for different topics in the target area without manually annotating a large number of training corpora, which greatly reduces the labor costs for the annotation, and at the same time, the problem that the accuracy of the topic recognition is low due to different standards of manual annotations can be solved. That is, the accuracy of the topic recognition is improved.

Figure 4:
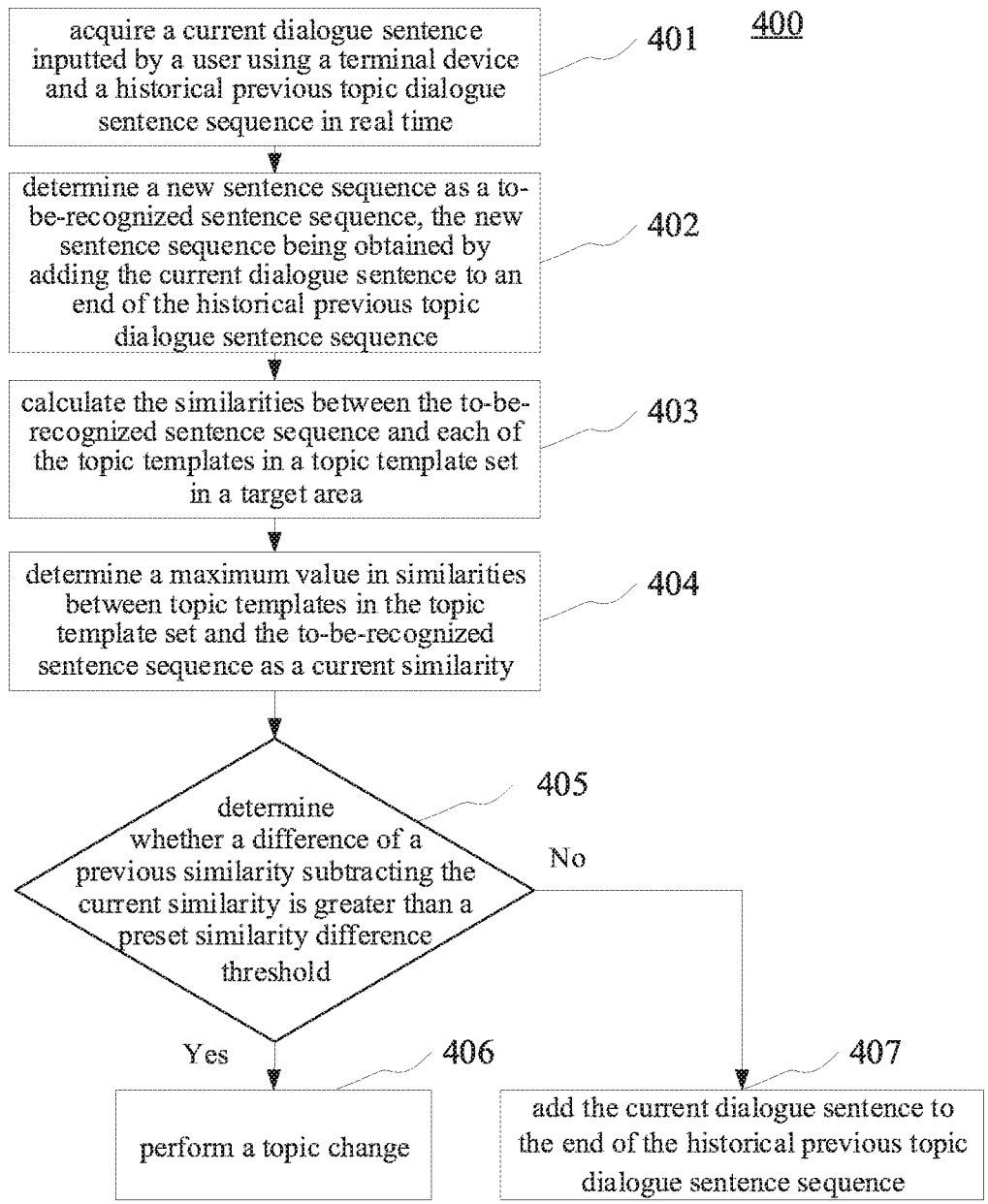
FIG. 4 is a flowchart of the method for determining a topic according to another embodiment of the present disclosure.

Further referring to FIG. 4, FIG. 4 illustrates a flow 400 of another embodiment of the method for determining a topic. The flow 400 of the method for determining a topic includes the following steps:

Step 401, acquiring a current dialogue sentence inputted by a user using a terminal device and a historical previous topic dialogue sentence sequence in real time.

In this embodiment, an executive body (e.g., the server shown in FIG. 1) of the method for determining a topic may acquire the current dialogue sentence inputted by the user via the terminal device and the historical previous topic dialogue sentence sequence in real time.

Here, the current dialogue sentence is a dialogue sentence currently inputted using the terminal device by the user. The historical previous topic dialogue sentence sequence is a dialogue sentence sequence belonging to the same topic and closest to the current moment in the dialogue sentence sequences inputted by the user before the current moment and stored in the executive body.

Step 402, determining a new sentence sequence as a to-be-recognized sentence sequence, the new sentence sequence being obtained by adding the current dialogue sentence to an end of the historical previous topic dialogue sentence sequence.

In this embodiment, the executive body may determine the new sentence sequence as the to-be-recognized sentence sequence, the new sentence sequence being obtained by adding the current dialogue sentence to the end of the historical previous topic dialogue sentence sequence. That is, in this case, the dialogue sentence sequence belonging to the same topic and closest to the current moment in the dialogue sentence sequences inputted by the user before the current moment and stored in the executive body, as well as the dialogue sentence inputted by the user at the current moment, are included in the to-be-recognized sentence sequence.

It may be understood that the dialogue sentence sequence in the historical previous topic dialogue sentence sequence reflects the same topic. At this time, in addition to the historical previous topic dialogue sentence sequence reflecting the same topic, the dialogue sentence inputted by the user at the current moment is also included in the to-be-recognized sentence sequence. However, the following steps needs to be implemented to determine whether the topic of the to-be-recognized sentence sequence generated by adding the dialogue sentence inputted at the current moment to the end of the historical previous topic dialogue sentence sequence is the same as that of the historical previous topic dialogue sentence sequence and whether the topic is changed.

Step 403, calculating similarities between the to-be-recognized sentence sequence and each of the topic templates in a topic template set in a target area.

Here, the executive body may calculate the similarities between the new sentence sequence (i.e., the to-be-recognized sentence sequence) obtained by adding the current dialogue sentence to the end of the historical previous topic dialogue sentence sequence and each of the topic templates in the topic template set in the target area.

Here, the specific operation of step 403 is substantially the same as that of step 202 in the embodiment shown in FIG. 2, which will not be repeatedly described here.

Step 404, determining a maximum value in similarities between topic templates in the topic template set and the to-be-recognized sentence sequence as a current similarity.

The similarities between the to-be-recognized sentence sequence and each of the topic templates in the topic template set are calculated in step 403. Here, the executive body may determine the maximum value in the similarities between the topic templates in the topic template set and the to-be-recognized sentence sequence as the current similarity.

Step 405, determining whether a difference of a previous similarity subtracting the current similarity is greater than a preset similarity difference threshold.

Here, the previous similarity refers to a similarity of the historical previous topic dialogue sentence sequence, and the similarity of the historical previous topic dialogue sentence sequence refers to a similarity between the historical previous topic dialogue sentence sequence and a topic template corresponding to the topic of the historical previous topic dialogue sentence sequence. It may also be understood as, at the previous moment, the executive body calculates the similarities between the to-be-recognized sentence sequence (i.e., the historical previous topic dialogue sentence sequence of the current moment) and each of the topic templates in the topic template set in the target area according to the method of step 403, and determine the maximum value in the similarities between the topic templates in the topic template set and the to-be-recognized sentence sequence (i.e., the historical previous topic dialogue sentence sequence of the current moment) as the similarity of the to-be-recognized sentence sequence (i.e., the historical previous topic dialogue sentence sequence of the current moment).

Here, if the difference of the previous similarity subtracting the current similarity is determined to be greater than the preset similarity difference threshold, it indicates that there is a high probability that the topic reflected by the dialogue sentence inputted by the user at the current moment is different from the topic reflected by the historical previous topic dialogue sentence sequence. That is, the user changes the topic, and thus, step 406 is performed. On the contrary, if the difference of the previous similarity subtracting the current similarity is determined to be not greater than the preset similarity difference threshold, it indicates that there is a high probability that the topic reflected by the dialogue sentence inputted by the user at the current moment is the same as the topic reflected by the historical previous topic dialogue sentence sequence. That is, the user continues the same topic, and thus, step 407 is performed.

Step 406, performing a topic change.

Here, in a situation where it is determined in step 405 that the difference of the previous similarity subtracting the current similarity is greater than the preset similarity difference threshold, the executive body may indicate that the user changes the topic at the current moment. Therefore, the executive body may perform the topic change. Specifically, the topic change may include the following operations:

In the first step, the historical previous topic dialogue sentence sequence and the corresponding topic, as a historical topic paragraph, are added to a historical topic paragraph sequence.

Here, the historical topic paragraph sequence is composed of at least one historical topic paragraph sorted in a chronological order. The historical topic paragraph includes a dialogue sentence sequence reflecting the same topic and the topic corresponding to the dialogue sentence sequence in dialogue sentence sequences ever inputted by the user, and a historical topic paragraph in the historical topic paragraph sequence is sorted according to the time of a dialogue sentence sequence inputted into the historical topic paragraph by the user.

Here, since the topics reflected by the dialogue sentence inputted by the user at the current moment and the historical previous topic dialogue sentence sequence are different (i.e., the user starts another topic from the current moment), the historical previous topic dialogue sentence sequence is already a complete dialogue sentence sequence of one topic, and the dialogue sentence currently inputted by the user cannot be added any more. In this case, the historical previous topic dialogue sentence sequence and the corresponding topic, as the historical topic paragraph, may be added to the historical topic paragraph sequence.

In the second step, the historical previous topic dialogue sentence sequence is cleared, and the current dialogue sentence is added to the historical previous topic dialogue sentence sequence.

After the second step, the historical previous topic dialogue sentence sequence only includes the current dialogue sentence. That is, the user starts a new topic, and the sentence sequence corresponding to the new topic only has the current dialogue sentence.

In the third step, the similarities between the historical previous topic dialogue sentence sequence and each of the topic templates in the topic template set are calculated.

In order to determine the topic of the historical previous topic dialogue sentence sequence which only has the current dialogue sentence, the similarities between the historical previous topic dialogue sentence sequence which only has the current dialogue sentence and each of the topic templates in the topic template set may be first calculated here. Specifically, the similarities between the historical previous topic dialogue sentence sequence only having the current dialogue sentence and the each of the topic templates in the topic template set may be calculated according to the method in step 403.

In the fourth step, a topic and a similarity corresponding to a topic template having a maximum similarity to the historical previous topic dialogue sentence sequence in the topic template set are respectively determined as the topic and the similarity of the historical previous topic dialogue sentence sequence.

In order to determine the topic and the similarity of the historical previous topic dialogue sentence sequence only having the current dialogue sentence, the topic and the similarity corresponding to the topic template having the maximum similarity to the historical previous topic dialogue sentence sequence in the topic template set may be respectively determined as the topic and the similarity of the historical previous topic dialogue sentence sequence.

After performing step 406, the executive body may proceed to step 401 and continue the execution until the user ends the dialogue.

Step 407, adding the current dialogue sentence to the end of the historical previous topic dialogue sentence sequence.

Here, in a situation where it is determined in step 405 that the difference of the previous similarity subtracting the current similarity is not greater than the preset similarity difference threshold, the executive body may indicate that the topic reflected by the dialogue sentence inputted by the user at the current moment and the topic reflected by the historical previous topic dialogue sentence sequence are same. That is, the user does not change the topic. In this case, the executive body may add the current dialogue sentence to the end of the historical previous topic dialogue sentence sequence, and thus, the current dialogue sentence reflecting the same topic is added in the historical previous topic dialogue sentence sequence. After performing step 407, the executive body may proceed to step 401 to continue the execution until the user ends the dialogue.

It may be seen from FIG. 4 that, as compared with the embodiment corresponding to FIG. 2, the flow 400 of the method for determining a topic in this embodiment implements the topic segmentation on the dialogue sentences inputted by the user in a self-help dialogue system in real time. Thus, the scheme described in this embodiment may facilitate deep understanding of dialogues in the self-help dialogue system, for example, a user intent and a slot position.

Figure 5:
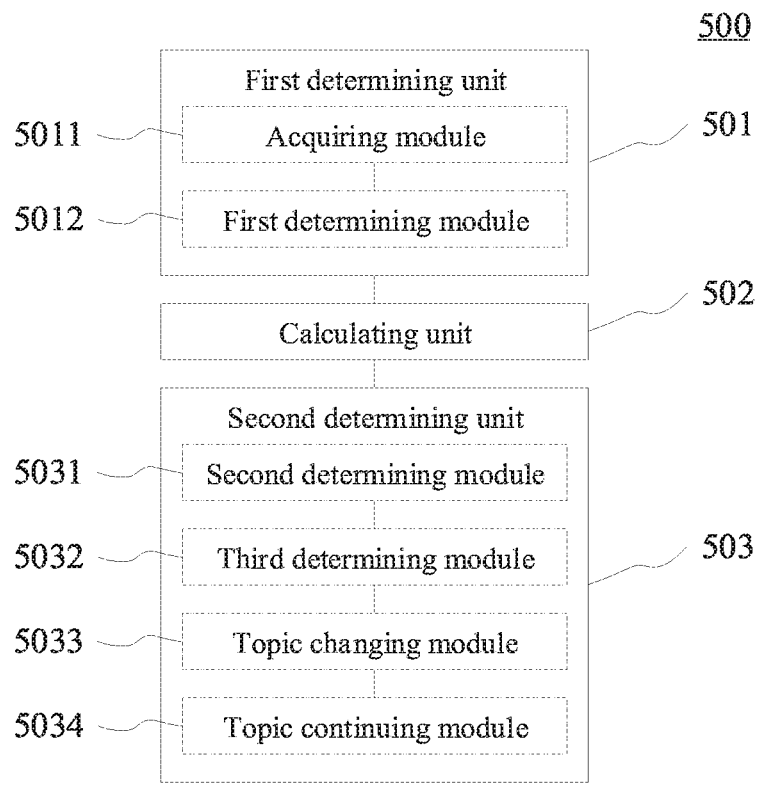
FIG. 5 is a schematic structural diagram an apparatus for determining a topic according to an embodiment of the present disclosure.

Further referring to FIG. 5, as an implementation of the method shown in the above drawings, some embodiments of the present disclosure provide an apparatus for determining a topic. The embodiments of the apparatus corresponds to the embodiments of the method shown in FIG. 2, and the apparatus may be applied in various electronic devices.

As shown in FIG. 5, the apparatus 500 for determining a topic in this embodiment includes: a first determining unit 501, a calculating unit 502 and a second determining unit 503. The first determining unit 501 is configured to determine a to-be-recognized sentence sequence. The calculating unit 502 is configured to calculate similarities between the to-be-recognized sentence sequence and each of topic templates in a topic template set in a target area, the each of the topic templates in the topic template set corresponding to a topic in at least one topic in the target area, a topic template including a topic section sequence, and a topic section including a topic sentence sequence. The second determining unit 503 is configured to determine a topic of the to-be-recognized sentence sequence according to an associated parameter, the associated parameter including the similarities between the to-be-recognized sentence sequence and the each of the topic templates in the topic template set.

In this embodiment, for specific processes of the first determining unit 501, the calculating unit 502 and the second determining unit 503 of the apparatus 500 for determining a topic, and their technical effects, reference may be made to relative descriptions of step 201, step 202 and step 203 in the corresponding embodiment of FIG. 2 respectively, which will not be repeatedly described here.

In some alternative implementations of this embodiment, the calculating unit 502 may be further configured to: for the each of the topic templates in the topic template set, determining a first similarity by executing following calculation: for each of to-be-recognized sentences in the to-be-recognized sentence sequence, calculating similarities between the to-be-recognized sentence and each of topic sentences included in the topic template; determining an optimal mapping approach in at least one mapping approach by using a dynamic programming algorithm, with an aim of maximizing a similarity between the to-be-recognized sentence sequence and the topic template calculated according to the mapping approach, the mapping approach being used to correspond the each of the to-be-recognized sentences in the to-be-recognized sentence sequence to a topic section in the topic template; and determining a similarity between the to-be-recognized sentence sequence and the topic template calculated according to the determined optimal mapping approach as the similarity between the to-be-recognized sentence sequence and the topic template.

In some alternative implementations of this embodiment, the similarity between the to-be-recognized sentence sequence and the topic template calculated according to the mapping approach may be calculated through a second similarity calculation. The second similarity calculation may include: for the each of to-be-recognized sentences in the to-be-recognized sentence sequence, determining a similarity between the to-be-recognized sentence and a mapping topic section corresponding to the to-be-recognized sentence, based on similarities between the to-be-recognized sentence and respective topic sentences in a topic sentence sequence included in the mapping topic section, wherein the mapping topic section corresponding to the to-be-recognized sentence refers to a topic section included in the topic template to which the to-be-recognized sentence is mapped according to the mapping approach; and determining an average value of similarities between to-be-recognized sentences in the to-be-recognized sentence sequence and the respective corresponding mapping topic sections as the similarity between the to-be-recognized sentence sequence and the topic template calculated according to the mapping approach.

In some alternative implementations of this embodiment, the similarity between the to-be-recognized sentence sequence and the topic template calculated according to the mapping approach may be calculated through a third similarity calculation. The third similarity calculation may include: for the each of to-be-recognized sentence in the to-be-recognized sentence sequence, determining the mapping topic section corresponding to the to-be-recognized sentence, the mapping topic section corresponding to the to-be-recognized sentence referring to the topic section included in the topic template to which the to-be-recognized sentence is mapped according to the mapping approach; for each of the topic sections included in the topic template, determining a similarity corresponding to the to-be-recognized sentence sequence and the topic section, based on similarities between respective topic sentences in a topic sentence sequence included in the topic section and respective to-be-recognized sentences mapped to the topic section;

and determining an average value of similarities corresponding to the to-be-recognized sentence sequence and topic sections included in the topic template as the similarity between the to-be-recognized sentence sequence and the topic template.

In some alternative implementations of this embodiment, the determining a similarity between the to-be-recognized sentence and a mapping topic section corresponding to the to-be-recognized sentence, based on similarities between the to-be-recognized sentence and respective topic sentences in a topic sentence sequence included in the mapping topic section includes: determining a maximum value in the similarities between the to-be-recognized sentence and the respective topic sentences in the topic sentence sequence included in the mapping topic section corresponding to the to-be-recognized sentence as the similarity between the to-be-recognized sentence and the corresponding mapping topic section.

In some alternative implementations of this embodiment, the determining a similarity between the to-be-recognized sentence and a mapping topic section corresponding to the to-be-recognized sentence, based on similarities between the to-be-recognized sentence and respective topic sentences in a topic sentence sequence included in the mapping topic section includes: determining a weighted average value of the similarities between the to-be-recognized sentence and the respective topic sentences in the topic sentence sequence included in the mapping topic section corresponding to the to-be-recognized sentence as the similarity between the to-be-recognized sentence and the corresponding mapping topic section.

In some alternative implementations of this embodiment, the second determining unit 502 may be further configured to: determine a topic corresponding to a topic template having a maximum similarity to the to-be-recognized sentence sequence in the topic template set as the topic of the to-be-recognized sentence sequence.

In some alternative implementations of this embodiment, the first determining unit 501 may include: an acquiring module 5011, configured to acquire a current dialogue sentence inputted by a user using a terminal device and a historical previous topic dialogue sentence sequence in real time; and a first determining module 5012, configured to determine a new sentence sequence as the to-be-recognized sentence sequence, the new sentence sequence being obtained by adding the current dialogue sentence to an end of the historical previous topic dialogue sentence sequence.

In some alternative implementations of this embodiment, the associated parameter may further include a topic and a similarity of the historical previous topic dialogue sentence sequence, and the similarity of the historical previous topic dialogue sentence sequence refers to a similarity between the historical previous topic dialogue sentence sequence and a topic template corresponding to the topic of the historical topic dialogue sentence sequence. The second determining unit 503 may include: a second determining module 5031, configured to determine a maximum value in similarities between respective topic templates in the topic template set and the to-be-recognized sentence sequence as a current similarity; a third determining module 5032, configured to determine whether a difference of a previous similarity subtracting the current similarity is greater than a preset similarity difference threshold, the previous similarity referring to the similarity of the historical previous topic dialogue sentence sequence; and a topic changing module 5033, configured to perform, in response to determining the difference being greater than the preset similarity difference threshold, a topic change: adding the historical previous topic dialogue sentence sequence and the corresponding topic, as a historical topic paragraph, to a historical topic paragraph sequence, a historical topic paragraph including a sentence sequence and a corresponding topic; clearing the historical previous topic dialogue sentence sequence, and adding the current dialogue sentence to the historical previous topic dialogue sentence sequence; calculating similarities between the historical previous topic dialogue sentence sequence and each of topic templates in the topic template set; and determining respectively a topic and a similarity corresponding to a topic template having a maximum similarity to the historical previous topic dialogue sentence sequence in the topic template set as the topic and the similarity of the historical previous topic dialogue sentence sequence. The second determining unit 503 may include: a topic continuing module 5034, configured to add, in response to determining the difference being not greater than the preset similarity difference threshold, the current dialogue sentence to the end of the historical previous topic dialogue sentence sequence.

It should be noted that, for the implementation details and the technical effects of the units in the apparatus for determining a topic provided by some embodiments of the present disclosure, reference may be made to the descriptions of other embodiments in the present disclosure, which will not be repeatedly described here.

Figure 6:
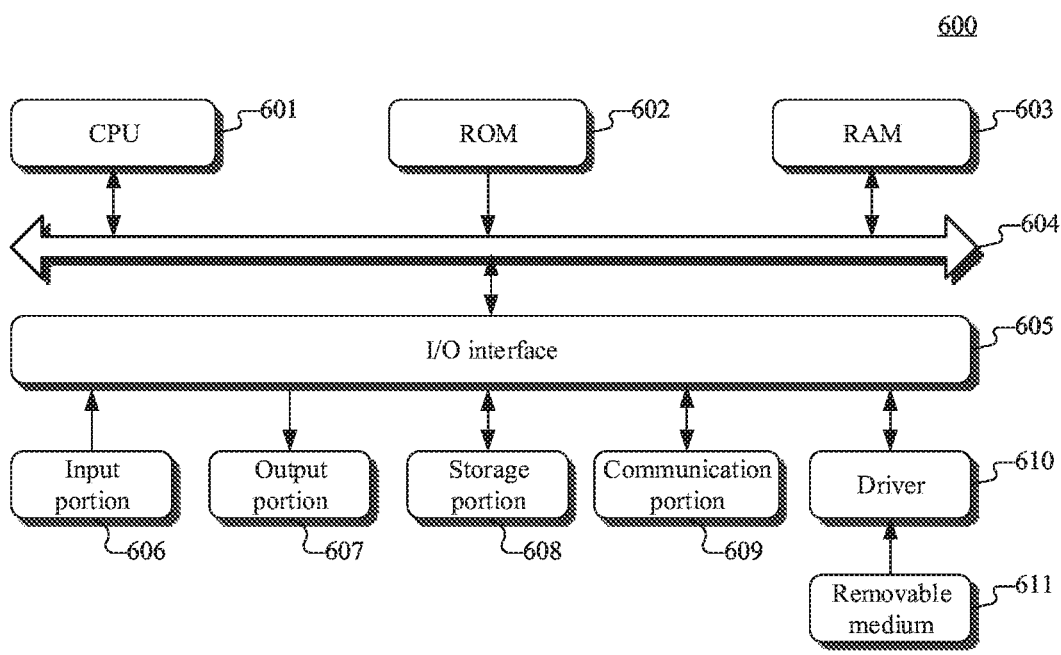
FIG. 6 is a schematic structural diagram of a computer system of a server adapted to implement the embodiments of the present disclosure.

Referring to FIG. 6, FIG. 6 is a schematic structural diagram of a computer system 600 adapted to implement a server according to some embodiments of the present disclosure. The server shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the method of the present disclosure. It should be noted that the computer readable medium in some embodiments of the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. Amore specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs, which may be used by a command execution system, apparatus or element or incorporated thereto. In some embodiments of the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to some embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising a first determining unit, a calculating unit and a second determining unit. The names of these units do not in some cases constitute a limitation to such units themselves. For example, the first determining unit may alternatively be described as "a unit for determining a to-be-recognized sentence sequence."

In another aspect, some embodiments of the present disclosure further provide a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: determine a to-be-recognized sentence sequence; calculate a similarity between the to-be-recognized sentence sequence and each topic template in a topic template set in a target area, the each topic template in the topic template set corresponding to a topic in at least one topic in the target area, the topic template including a topic section sequence, and a topic section including a topic sentence sequence; and determine a topic of the to-be-recognized sentence sequence according to an associated parameter, the associated parameter including the similarity between the to-be-recognized sentence sequence and the each topic template in the topic template set.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in some embodiments of the present disclosure with (but not limited to) technical features with similar functions.

What is claimed is:

1. A method for determining a topic, applied to a processor supporting a self-help dialogue system, comprising:
   determining, by the processor, a to-be-recognized sentence sequence, comprising: acquiring a current dialogue sentence inputted by a user through a terminal device and a historical previous topic dialogue sentence sequence in real time, and obtaining the to-be-recognized sentence sequence by adding the current dialogue sentence to an end of the historical previous topic dialogue sentence sequence;

processing, by the processor, the to-be-recognized sentence sequence, comprising:

calculating a similarity between the to-be-recognized sentence sequence and each of topic templates in a topic template set in a target area, each of the topic templates in the topic template set corresponding to a topic in at least one topic in the target area, a topic template comprising a topic section sequence, and a topic section comprising a topic sentence sequence; and determining a topic of the to-be-recognized sentence sequence according to an associated parameter, the associated parameter comprising the calculated similarity between the to-be-recognized sentence sequence and each of the topic templates in the topic template set; and returning, by the processor, dialogue content of a self-help reply to the terminal device, wherein the dialogue content of the self-help reply relates to the topic of the to-be-recognized sentence sequence, wherein the calculating the similarity between the to-be-recognized sentence sequence and each of the topic templates in the topic template set comprises executing a first similarity calculation for each of the topic templates in the topic template set, and wherein the first similarity calculation comprises: for each of to-be-recognized sentences in the to-be-recognized sentence sequence, calculating similarities between the to-be-recognized sentence and each of topic sentences included in the topic template; determining an optimal mapping approach in at least one mapping approach by using a dynamic programming algorithm, with an aim of maximizing a similarity between the to-be-recognized sentence sequence and the topic template calculated according to a mapping approach, the mapping approach being used to correspond each of the to-be-recognized sentences in the to-be-recognized sentence sequence to a topic section in the topic template; and determining a similarity between the to-be-recognized sentence sequence and the topic template calculated according to the determined optimal mapping approach as the similarity between the to-be-recognized sentence sequence and the topic template.

2. The method according to claim 1, wherein the determining the similarity between the to-be-recognized sentence sequence and the topic template calculated according to the determined optimal mapping approach comprises determining the similarity between the to-be-recognized sentence sequence and the topic template through a second similarity calculation, and the second similarity calculation comprises:

for each of to-be-recognized sentences in the to-be-recognized sentence sequence, determining a similarity between the to-be-recognized sentence and a mapping topic section corresponding to the to-be-recognized sentence, based on similarities between the to-be-recognized sentence and respective topic sentences in a topic sentence sequence included in the mapping topic section, wherein the mapping topic section corresponding to the to-be-recognized sentence refers to a topic section included in the topic template to which the to-be-recognized sentence is mapped according to the determined optimal mapping approach; and determining an average value of similarities between to-be-recognized sentences in the to-be-recognized sentence sequence and the respective corresponding mapping topic sections as the similarity between the to-be-recognized sentence sequence and the topic template calculated according to the determined optimal mapping approach.

3. The method according to claim 2, wherein the determining a similarity between the to-be-recognized sentence and a mapping topic section corresponding to the to-be-recognized sentence, based on similarities between the to-be-recognized sentence and respective topic sentences in a topic sentence sequence included in the mapping topic section comprises:

determining a maximum value in the similarities between the to-be-recognized sentence and the respective topic sentences in the topic sentence sequence included in the mapping topic section corresponding to the to-be-recognized sentence as the similarity between the to-be-recognized sentence and the corresponding mapping topic section.

4. The method according to claim 2, wherein the determining a similarity between the to-be-recognized sentence and a mapping topic section corresponding to the to-be-recognized sentence, based on similarities between the to-be-recognized sentence and respective topic sentences in a topic sentence sequence included in the mapping topic section comprises:

determining a weighted average value of the similarities between the to-be-recognized sentence and the respective topic sentences in the topic sentence sequence included in the mapping topic section corresponding to the to-be-recognized sentence as the similarity between the to-be-recognized sentence and the corresponding mapping topic section.

5. The method according to claim 1, wherein the determining the similarity between the to-be-recognized sentence sequence and the topic template calculated according to the determined optimal mapping approach comprises determining the similarity between the to-be-recognized sentence sequence and the topic template through a third similarity calculation, and the third similarity calculation comprises:

for each of to-be-recognized sentences in the to-be-recognized sentence sequence, determining the mapping topic section corresponding to the to-be-recognized sentence, the mapping topic section corresponding to the to-be-recognized sentence referring to the topic section included in the topic template to which the to-be-recognized sentence is mapped according to the determined optimal mapping approach;

for each of the topic sections included in the topic template, determining a similarity corresponding to the to-be-recognized sentence sequence and the topic section, based on similarities between respective topic sentences in a topic sentence sequence included in the topic section and respective to-be-recognized sentences mapped to the topic section; and determining an average value of similarities corresponding to the to-be-recognized sentence sequence and topic sections included in the topic template as the similarity between the to-be-recognized sentence sequence and the topic template.

6. The method according to claim 1, wherein the determining a topic of the to-be-recognized sentence sequence according to an associated parameter comprises:

determining a topic corresponding to a topic template having a maximum similarity to the to-be-recognized sentence sequence in the topic template set as the topic of the to-be-recognized sentence sequence.

7. The method according to claim 1, wherein the associated parameter further comprises a topic and a similarity of the historical previous topic dialogue sentence sequence, the similarity of the historical previous topic dialogue sentence sequence refers to a similarity between the historical previous topic dialogue sentence sequence and a topic template corresponding to the topic of the historical previous topic dialogue sentence sequence, and the determining the topic of the to-be-recognized sentence sequence comprising:

determining a maximum value in similarities between respective topic templates in the topic template set and the to-be-recognized sentence sequence as a current similarity;

determining a difference of a previous similarity subtracting the current similarity, the previous similarity referring to the similarity of the historical previous topic dialogue sentence sequence; and in response to determining that the determined difference is greater than a preset similarity difference threshold, performing a topic change.

8. The method according to claim 7, wherein the topic change comprises: adding the historical previous topic dialogue sentence sequence and the corresponding topic, as a historical topic paragraph, to a historical topic paragraph sequence, a historical topic paragraph comprising a sentence sequence and a corresponding topic; clearing the historical previous topic dialogue sentence sequence, and adding the current dialogue sentence to the historical previous topic dialogue sentence sequence; calculating a similarity between the historical previous topic dialogue sentence sequence and each of the topic templates in the topic template set; and determining respectively a topic and a similarity corresponding to a topic template having a maximum similarity to the historical previous topic dialogue sentence sequence in the topic template set as the topic and the similarity of the historical previous topic dialogue sentence sequence; and wherein the determining the topic of the to-be-recognized sentence sequence further comprises:

in response to determining the difference being not greater than the preset similarity difference threshold, adding the current dialogue sentence to the end of the historical previous topic dialogue sentence sequence.

9. An apparatus for determining a topic, comprising:

at least one processor; and a memory storing instructions, the instructions when executed by the at least one processor supporting a self-help dialogue system, cause the at least one processor to perform operations, the operations comprising:

determining a to-be-recognized sentence sequence, comprising: acquiring a current dialogue sentence inputted by a user through a terminal device and a historical previous topic dialogue sentence sequence in real time, and obtaining the to-be-recognized sentence sequence by adding the current dialogue sentence to an end of the historical previous topic dialogue sentence sequence;

processing, by the processor, the to-be-recognized sentence sequence, comprising:

calculating a similarity between the to-be-recognized sentence sequence and each of topic templates in a topic template set in a target area, each of the topic templates in the topic template set corresponding to a topic in at least one topic in the target area, a topic template comprising a topic section sequence, and a topic section comprising a topic sentence sequence; and determining a topic of the to-be-recognized sentence sequence according to an associated parameter, the associated parameter comprising the calculated similarity between the to-be-recognized sentence sequence and each of the topic templates in the topic template set; and returning, by the processor, dialogue content of a self-help reply to the terminal device, wherein the dialogue content of the self-help reply relates to the topic of the to-be-recognized sentence sequence, wherein the calculating the similarity between the to-be-recognized sentence sequence and each of the topic templates in the topic template set comprises executing a first similarity calculation for each of the topic templates in the topic template set, and wherein the first similarity calculation comprises: for each of to-be-recognized sentences in the to-be-recognized sentence sequence, calculating similarities between the to-be-recognized sentence and each of topic sentences included in the topic template;

determining an optimal mapping approach in at least one mapping approach by using a dynamic programming algorithm, with an aim of maximizing a similarity between the to-be-recognized sentence sequence and the topic template calculated according to a mapping approach, the mapping approach being used to correspond each of the to-be-recognized sentences in the to-be-recognized sentence sequence to a topic section in the topic template; and determining a similarity between the to-be-recognized sentence sequence and the topic template calculated according to the determined optimal mapping approach as the similarity between the to-be-recognized sentence sequence and the topic template.

10. The apparatus according to claim 9, wherein the determining the similarity between the to-be-recognized sentence sequence and the topic template calculated according to the determined optimal mapping approach comprises determining the similarity between the to-be-recognized sentence sequence and the topic template through a second similarity calculation, and the second similarity calculation comprises:

for each of to-be-recognized sentences in the to-be-recognized sentence sequence, determining a similarity between the to-be-recognized sentence and a mapping topic section corresponding to the to-be-recognized sentence, based on similarities between the to-be-recognized sentence and respective topic sentences in a topic sentence sequence included in the mapping topic section, wherein the mapping topic section corresponding to the to-be-recognized sentence refers to a topic section included in the topic template to which the to-be-recognized sentence is mapped according to the determined optimal mapping approach; and determining an average value of similarities between to-be-recognized sentences in the to-be-recognized sentence sequence and the respective corresponding mapping topic sections as the similarity between the to-be-recognized sentence sequence and the topic template calculated according to the determined optimal mapping approach.

11. The apparatus according to claim 10, wherein the determining a similarity between the to-be-recognized sentence and a mapping topic section corresponding to the to-be-recognized sentence, based on similarities between the to-be-recognized sentence and respective topic sentences in a topic sentence sequence included in the mapping topic section comprises:
- determining a maximum value in the similarities between the to-be-recognized sentence and the respective topic sentences in the topic sentence sequence included in the mapping topic section corresponding to the to-be-recognized sentence as the similarity between the to-be-recognized sentence and the corresponding mapping topic section.

12. The apparatus according to claim 9, wherein the determining the similarity between the to-be-recognized sentence sequence and the topic template calculated according to the determined optimal mapping approach comprises determining the similarity between the to-be-recognized sentence sequence and the topic template through a third similarity calculation, and the third similarity calculation comprises:
- for each of to-be-recognized sentences in the to-be-recognized sentence sequence, determining the mapping topic section corresponding to the to-be-recognized sentence, the mapping topic section corresponding to the to-be-recognized sentence referring to the topic section included in the topic template to which the to-be-recognized sentence is mapped according to the determined optimal mapping approach;
- for each of the topic sections included in the topic template, determining a similarity corresponding to the to-be-recognized sentence sequence and the topic section, based on similarities between respective topic sentences in a topic sentence sequence included in the topic section and respective to-be-recognized sentences mapped to the topic section; and
- determining an average value of similarities corresponding to the to-be-recognized sentence sequence and topic sections included in the topic template as the similarity between the to-be-recognized sentence sequence and the topic template.

13. The apparatus according to claim 10, wherein the determining a similarity between the to-be-recognized sentence and a mapping topic section corresponding to the to-be-recognized sentence, based on similarities between the to-be-recognized sentence and respective topic sentences in a topic sentence sequence included in the mapping topic section comprises:
- determining a weighted average value of the similarities between the to-be-recognized sentence and the respective topic sentences in the topic sentence sequence included in the mapping topic section corresponding to the to-be-recognized sentence as the similarity between the to-be-recognized sentence and the corresponding mapping topic section.

14. The apparatus according to claim 9, wherein the determining a topic of the to-be-recognized sentence sequence according to an associated parameter comprises:
- determining a topic corresponding to a topic template having a maximum similarity to the to-be-recognized sentence sequence in the topic template set as the topic of the to-be-recognized sentence sequence.

15. The apparatus according to claim 9, wherein the associated parameter further comprises a topic and a similarity of the historical previous topic dialogue sentence sequence, the similarity of the historical previous topic dialogue sentence sequence refers to a similarity between the historical previous topic dialogue sentence sequence and a topic template corresponding to the topic of the historical previous topic dialogue sentence sequence, and the determining the topic of the to-be-recognized sentence sequence comprising:
- determining a maximum value in similarities between respective topic templates in the topic template set and the to-be-recognized sentence sequence as a current similarity;
- determining a difference of a previous similarity subtracting the current similarity, the previous similarity referring to the similarity of the historical previous topic dialogue sentence sequence; and
- in response to determining that the determined difference is greater than a preset similarity difference threshold, performing a topic change.

16. The apparatus according to claim 15, wherein
the topic change comprises: adding the historical previous topic dialogue sentence sequence and the corresponding topic, as a historical previous topic paragraph, to a historical previous topic paragraph sequence, a historical previous topic paragraph comprising a sentence sequence and a corresponding topic; clearing the historical previous topic dialogue sentence sequence, and adding the current dialogue sentence to the historical previous topic dialogue sentence sequence; calculating similarities between the historical previous topic dialogue sentence sequence and each of the topic templates in the topic template set; and determining respectively a topic and a similarity corresponding to a topic template having a maximum similarity to the historical previous topic dialogue sentence sequence in the topic template set as the topic and the similarity of the historical previous topic dialogue sentence sequence; and wherein the determining the topic of the to-be-recognized sentence sequence further comprises:
- in response to determining the difference being not greater than the preset similarity difference threshold, adding the current dialogue sentence to the end of the historical previous topic dialogue sentence sequence.

17. A non-transitory computer readable storage medium storing a computer program, wherein the computer program, when executed by a processor supporting a self-help dialogue system, causes the processor to perform operations, the operations comprising:
- determining a to-be-recognized sentence sequence, comprising: acquiring a current dialogue sentence inputted by a user through a terminal device and a historical previous topic dialogue sentence sequence in real time, and determining obtaining the to-be-recognized sentence sequence by adding the current dialogue sentence to an end of the historical previous topic dialogue sentence sequence;
- processing, by the processor, the to-be-recognized sentence sequence, comprising:
  - calculating a similarity between the to-be-recognized sentence sequence and each of topic templates in a topic template set in a target area, each of the topic templates in the topic template set corresponding to a topic in at least one topic in the target area, a topic template comprising a topic section sequence, and a topic section comprising a topic sentence sequence; and
  - determining a topic of the to-be-recognized sentence sequence according to an associated parameter, the associated parameter comprising the calculated similarity between the to-be-recognized sentence sequence and each of the topic templates in the topic template set; and returning, by the processor, dialogue content of a self-help reply to the terminal device, wherein the dialogue content of the self-help reply relates to the topic of the to-be-recognized sentence sequence, wherein the calculating the similarity between the to-be-recognized sentence sequence and each of the topic templates in the topic template set comprises executing a first similarity calculation for each of the topic templates in the topic template set, and wherein the first similarity calculation comprises: for each of to-be-recognized sentences in the to-be-recognized sentence sequence, calculating similarities between the to-be-recognized sentence and each of topic sentences included in the topic template; determining an optimal mapping approach in at least one mapping approach by using a dynamic programming algorithm, with an aim of maximizing a similarity between the to-be-recognized sentence sequence and the topic template calculated according to a mapping approach, the mapping approach being used to correspond each of the to-be-recognized sentences in the to-be-recognized sentence sequence to a topic section in the topic template; and determining a similarity between the to-be-recognized sentence sequence and the topic template calculated according to the determined optimal mapping approach as the similarity between the to-be-recognized sentence sequence and the topic template.

\* \* \* \* \*